(12) United States Patent
Tokuda et al.

(10) Patent No.: US 6,765,706 B2
(45) Date of Patent: Jul. 20, 2004

(54) OPTICAL DEFLECTOR

(75) Inventors: Kazunari Tokuda, Hachioji (JP);
Masahiro Katashiro, Hachioji (JP);
Michitsugu Arima, Kamiina-gun (JP);
Hiroshi Miyajima, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/219,639

(22) Filed: Aug. 15, 2002

(65) Prior Publication Data
US 2003/0038693 A1 Feb. 27, 2003

(30) Foreign Application Priority Data
Aug. 23, 2001 (JP) .................................. 2001-253360

(51) Int. Cl.⁷ .................... G02B 26/08; H01H 51/22
(52) U.S. Cl. ........................ 359/220; 359/224; 335/78
(58) Field of Search ................................ 359/197, 198, 359/223, 224, 577, 199, 200, 220; 335/69, 80, 148, 149, 177, 265, 78

(56) References Cited

U.S. PATENT DOCUMENTS

| 5,912,608 A | 6/1999 | Asada ........................ 335/222 |
| 6,108,118 A * | 8/2000 | Minamoto ................... 359/224 |
| 6,388,789 B1 | 5/2002 | Bernstein ..................... 359/198 |
| 2002/0060830 A1 * | 5/2002 | Miyajima et al. ........... 359/224 |
| 2002/0113675 A1 * | 8/2002 | Kato et al. ..................... 335/80 |

* cited by examiner

Primary Examiner—Georgia Epps
Assistant Examiner—M. Hasan
(74) Attorney, Agent, or Firm—Scully, Scott, Murphy & Presser

(57) ABSTRACT

There is disclosed an optical deflector comprising an oscillating member including a movable plate allowed to oscillate, the movable plate including a coil extending along its periphery, and a magnetic field generation portion, such that the movable plate oscillates in accordance with a force generated by an interaction of a current flowing through the coil with the magnetic field generated by the magnetic field generation portion, wherein the movable plate has first and second surfaces extending in substantially parallel with each other, an imaginary plane including the first surface of the movable plate in a neutral position defines two spaces, one including the second surface of the movable plate and the other not including the second surface, and the magnetic field generation portion is positioned in the space including the second surface of the movable plate.

14 Claims, 10 Drawing Sheets

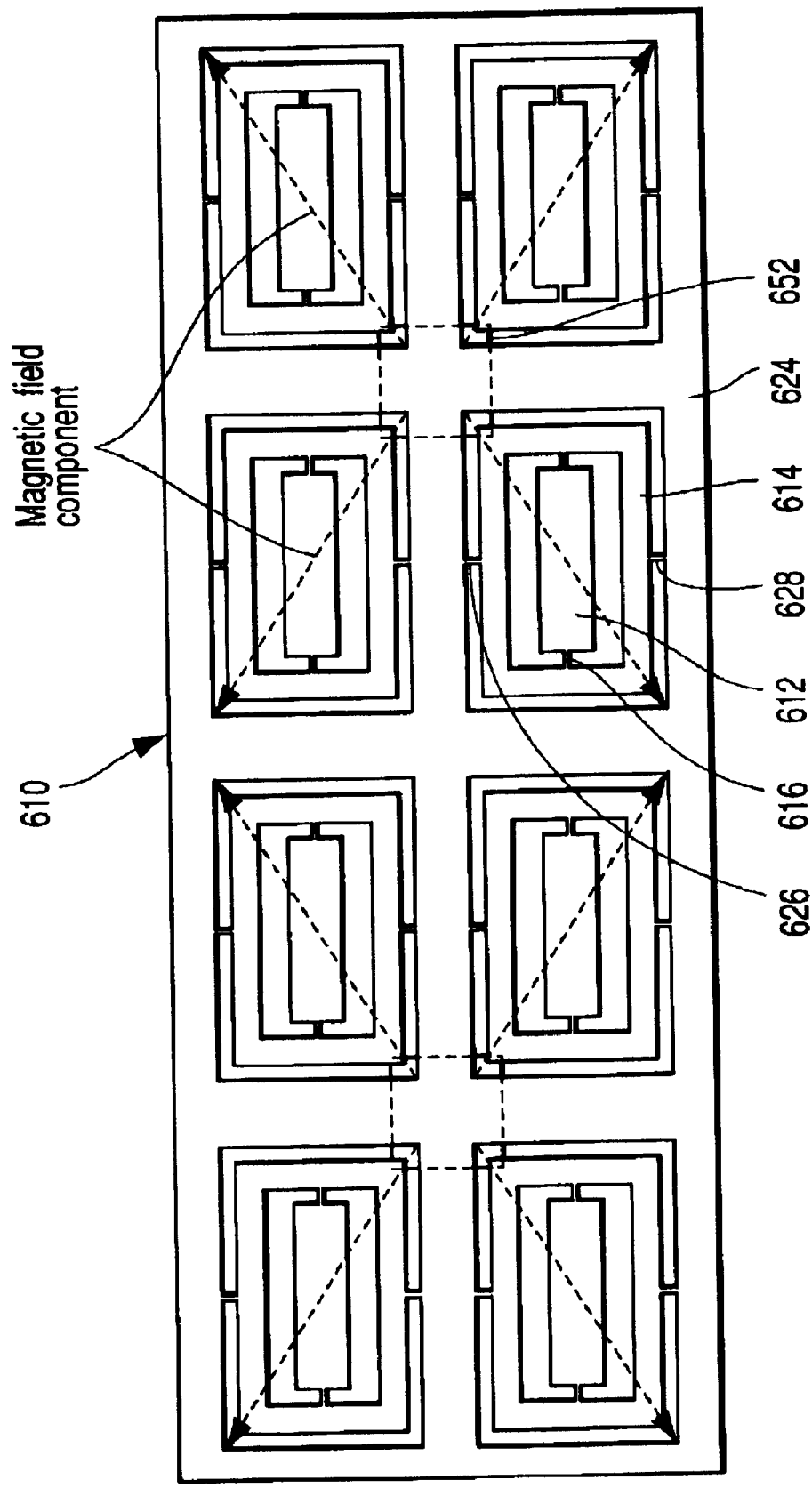

OPTICAL DEFLECTOR

CROSS-REFERENCE TO RELATED APPLICATIONS

This application is based upon and claims the benefit of priority from the prior Japanese Patent Application No. 2001-253360, filed Aug. 23, 2001, the entire contents of which are incorporated herein by reference.

BACKGROUND OF THE INVENTION

1. Field of the Invention

The present invention relates to an optical deflector with an oscillating member prepared by the semiconductor manufacturing technique, and in particularly, to an optical deflector of the electromagnetic driving type.

2. Description of the Related Art

As an optical deflector prepared by the semiconductor manufacturing technique, there has heretofore been a planar electromagnetic actuator disclosed in U.S. Pat. No. 5,912,608. The planar electromagnetic actuator comprises: a structure member integrally formed by a frame-shaped outer movable portion, an inner movable portion positioned inside the outer movable portion, a first torsion bar for supporting the outer movable portion so as to allow the outer movable portion to oscillate, and a second torsion bar for supporting the inner movable portion with respect to the outer movable portion so as to allow the inner movable portion to oscillate; and two permanent magnets disposed on opposite sides of the structure member.

The first torsion bar crosses at right angles to the second torsion bar, and the inner movable portion is, therefore, allowed to oscillate about two axes crossing at right angles to each other. The outer and inner movable portions include electromagnetic coils. Two permanent magnets are arranged on a diagonal line of the movable portion, in other words, on a line obliquely intersecting with any one of two oscillation axes.

In the actuator or optical deflector of the electromagnetic driving type, a current flowing through the electromagnetic coil disposed in the movable portion receives Lorentz force by an interaction with a magnetic field crossing at right angles to the oscillation axis of the movable portion. Thereby, the movable portion is oscillated. Therefore, each permanent magnet is usually disposed in the vicinity of each side of the movable portion, that is, four permanent magnets are arranged in total for a two-dimensional driving.

In the electromagnetic actuator described in the above-described patent, the magnetic field obliquely crossing two oscillation axes of the movable portion is generated by only the two permanent magnets generate. The magnetic field can be split into two components crossing at right angles to two oscillation axes. By the Lorentz force generated by the interaction of two magnetic field components with the current flowing through the electromagnetic coil of the inner or outer movable portion, the inner movable portion is allowed to oscillate about two axes crossing at right angles to each other.

Not only in the above-described planar electromagnetic actuator (optical deflector) but also in the electromagnetic driving type of actuator (optical deflector) that has heretofore been known, the permanent magnets are disposed beside the movable portion. Therefore, in an optical deflector of the electromagnetic driving type of optical deflector constituted by mounting a mirror on the movable portion of the actuator, the permanent magnet projects forwards from at least the mirror. Therefore, a beam of light incident upon the mirror at a small angle, in other words, a beam of light incident with a large incidence angle is diverted by the permanent magnet, and a situation in which the deflector cannot accurately function possibly occurs.

Moreover, since the permanent magnet is disposed beside the movable portion, an area occupied by the electromagnetic driving type of actuator is very large in a projection onto a surface parallel to the surface of the movable portion in a neutral position. Here, the movable portion in the neutral position is a movable portion which is not oscillated/dislocated. Such an actuator or optical deflector of the electromagnetic driving type is not suitable for an endoscope. That is, it is difficult to dispose an actuator or optical deflector of the electromagnetic driving type, which includes the permanent magnet disposed beside the movable portion, in a narrow space of an endoscope tip end having a small diameter.

BRIEF SUMMARY OF THE INVENTION

An optical deflector according to the present invention comprises: an oscillating member including at least one movable plate allowed to oscillate in at least one dimension, the movable plate including a coil extending along the periphery of the movable plate; and a magnetic field generation portion, which generates a magnetic field, such that the movable plate oscillates in accordance with a force generated by an interaction of a current flowing through the coil with the magnetic field generated by the magnetic field generation portion, wherein the movable plate has first and second surfaces forming front and back surfaces, respectively, and extending in substantially parallel with each other, an imaginary plane including the first surface of the movable plate in a neutral position defines two spaces, one including the second surface of the movable plate and the other not including the second surface, and the magnetic field generation portion is positioned in the space including the second surface of the movable plate.

More preferably, an imaginary plane including the second surface of the movable plate in a neutral position defines two spaces, one including the first surface of the movable plate and the other not including the first surface, and the magnetic field generation portion is positioned in the space not including the first surface of the movable plate. Furthermore, in a projection onto an imaginary plane parallel to the first surface of the movable plate in the neutral position, preferably, the magnetic field generation portion and oscillating member at least partially overlap with each other, and more preferably, the magnetic field generation portion is positioned inside a contour of the oscillating member.

According to the present invention, there is provided an electromagnetic driving type optical deflector in which a beam of light incident upon a movable plate is not diverted by permanent magnets. Since the optical deflector according to the present invention has a small occupying area in a projection onto a plane parallel to the surface of the movable plate in the neutral position, the optical deflector is suitable for incorporation into an endoscope tip end.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a plan view of the optical deflector shown in FIG. 14.

DETAILED DESCRIPTION OF THE INVENTION

Embodiments of the present invention will be described hereinafter with reference to the drawings.

First Embodiment

An optical deflector according to a first embodiment of the present invention will be described with reference to FIGS. 1 to 3.

Figure 1:
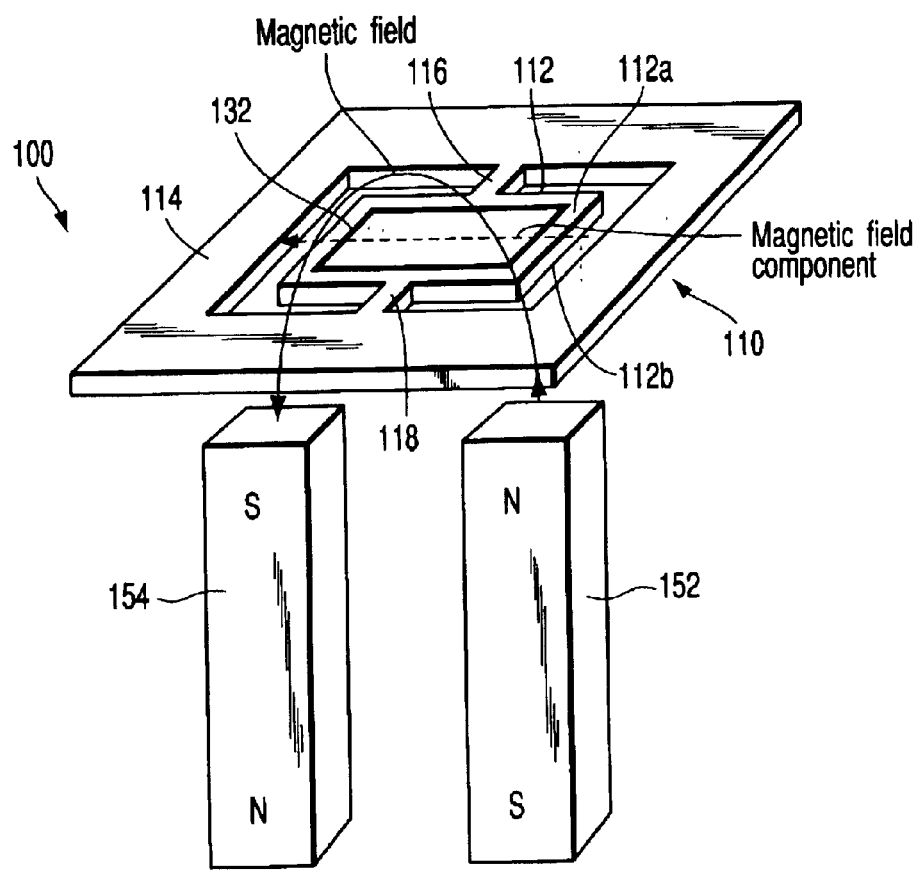
FIG. 1 is a perspective view of an optical deflector according to a first embodiment of the present invention.
Figure 2:
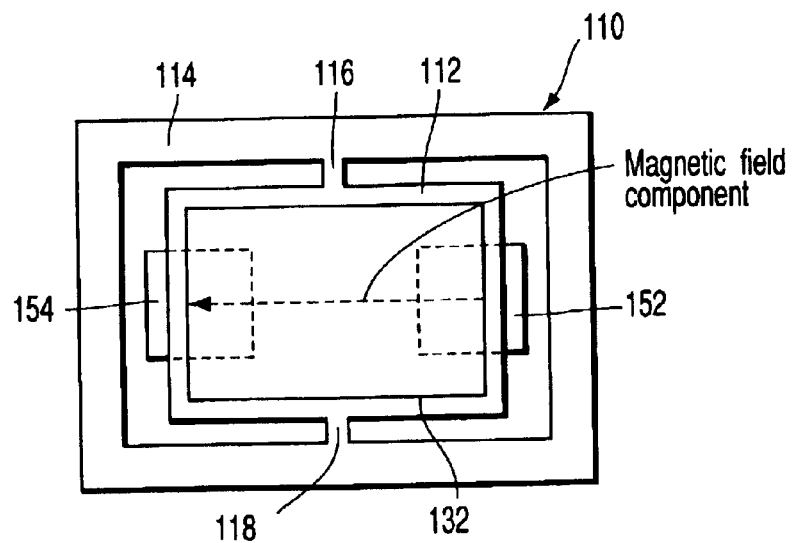
FIG. 2 is a plan view of the optical deflector shown in FIG. 1.

As shown in FIGS. 1 and 2, an optical deflector 100 includes an oscillating member 110 including one movable plate 112 allowed to oscillate in one dimension. The oscillating member 110 includes the movable plate 112, a frame-shaped support portion 114 for supporting the movable plate 112, and a pair of torsion bars 116, 118 which connect the movable plate 112 to the support portion 114. The pair of torsion bars 116, 118 support the movable plate 112 with respect to the support portion 114 so as to allow the plate to oscillate about an axis passed through the torsion bars 116, 118.

The movable plate 112 includes an electromagnetic coil 132 extending along the periphery of the plate. In FIG. 1, the electromagnetic coil 132 is schematically shown as sides of a quadrangle in order to show the winding of the coil. Opposite ends (not shown) of the coil are connected to wires passed through the torsion bars 116, 118, and the wires are terminated in electrode pads disposed in the support portion 114.

The oscillating member 110 may be prepared from a semiconductor substrate of silicon by the semiconductor manufacturing technique.

The optical deflector 100 further includes two permanent magnets 152, 154 as magnetic field generation portion for generating the magnetic field which acts on the electromagnetic coil 132.

The movable plate 112 includes two surfaces, a first surface 112a and second surface 112b, which form front and back surfaces, and extend substantially in parallel with each other. For example, a light emitting element such as a semiconductor laser, which emits a light beam, is attached to the first surface 112a of the movable plate 112. Thereby, the light beam emitted from the light emitting element is deflected in accordance with the oscillation of the movable plate 112.

Alternatively, the first surface 112a of the movable plate 112 may function as a reflective surface, or a reflective mirror may be mounted on the first surface 112a of the movable plate 112. Thereby, the light beam reflected by the movable plate 112 is deflected in accordance with the oscillation of the movable plate 112.

In the present specification, relating to two surfaces (first and second surfaces) as the front and back surfaces of the movable plate 112, the surface that the light emitting element is attached to, or that functions as the reflective surface, or that the reflective mirror is mounted on will be referred to as the front surface, and the other surface is referred to as the back surface.

The two permanent magnets 152, 154 are positioned in a space including at least the second surface 112b of the movable plate 112 in two spaces divided by an imaginary plane including the first surface 112a of the movable plate 112 in a neutral position as a boundary.

In other words, an imaginary plane including the first surface 112a of the movable plate 112 in a neutral position defines two spaces, one including the second surface 112b of the movable plate 112, and the other not including the second surface 112b, and the two permanent magnets 152, 154 are positioned in the space that includes the second surface 112b of the movable plate 112.

Here, the movable plate 112 in the neutral position indicates that the movable plate 112 does not receive any force, that is, the movable plate 112 is not inclined with respect to the support portion 114.

More preferably, the two permanent magnets 152, 154 are positioned in the space not including the first surface 112a of the movable plate 112 in two spaces divided by the imaginary plane including the second surface 112b of the movable plate 112 in the neutral position as the boundary.

In other words, an imaginary plane including the second surface 112b of the movable plate 112 defines two spaces, one including the first surface 112a of the movable plate 112, and the other not including the first surface 112a, and the two permanent magnets 152, 154 are more preferably positioned in the space that not includes the first surface 112a of the movable plate 112.

Briefly speaking, both of the permanent magnets 152, 154 are positioned on the side of the back surface of the movable plate with respect to the oscillating member 110.

Furthermore, as shown in FIG. 2, the two permanent magnets 152, 154 are off the oscillation axis, and symmetrically positioned with respect to a center of the movable plate in a projection onto the imaginary plane parallel to the surface (first surface 112a or second surface 112b) of the movable plate 112 in the neutral position. In the above-described projection, the permanent magnets 152, 154 at least partially overlap with the oscillating member 110. In the projection, the two permanent magnets 152, 154 preferably cross the contour of the oscillating member 110, and are more preferably positioned inside the contour of the oscillating member 110. That is, the permanent magnets 152, 154 are not depart from the oscillating member 110 in the projection.

As shown in FIG. 1, the permanent magnets 152, 154 are arranged in parallel with each other, and have opposite magnetization directions. The magnetization directions of the permanent magnets 152, 154 are both parallel to the normal to the movable plate 112 in the neutral position. The permanent magnets 152, 154 provide a magnetic field component that crosses at right angles to the oscillation axis of the movable plate 112 and extends substantially in parallel with the first surface (or the second surface).

An operation of the movable plate 112 of the optical deflector 100 will be described hereinafter.

A current is supplied to the electromagnetic coil 132 through the wires. The current flowing through the electromagnetic coil 132 receives a Lorentz force by an interaction with the magnetic field component. A magnitude of the Lorentz force depends on a magnitude of the supplied current.

A pair of portions of the electromagnetic coil 132 extending in parallel to the oscillation axis receive a force substantially vertical to the surface of the movable plate 112 by the Lorentz force received by the current flowing through the portions. Moreover, since the currents flowing through the pair of portions flow opposite to each other, the movable plate 112 receives a force couple about the oscillation axis.

The movable plate 112 turns or oscillates about the oscillation axis in accordance with the magnitude of the current flowing through the electromagnetic coil 132. When the current is a constant direct current, the movable plate 112 turns or tilts about the oscillation axis in an angular direction by a constant angle. When the current is an alternating current having a constant amplitude, the movable plate 112 repeatedly turns or vibrates with a constant amplitude about the oscillation axis in opposite directions by the constant angle.

Figure 3:
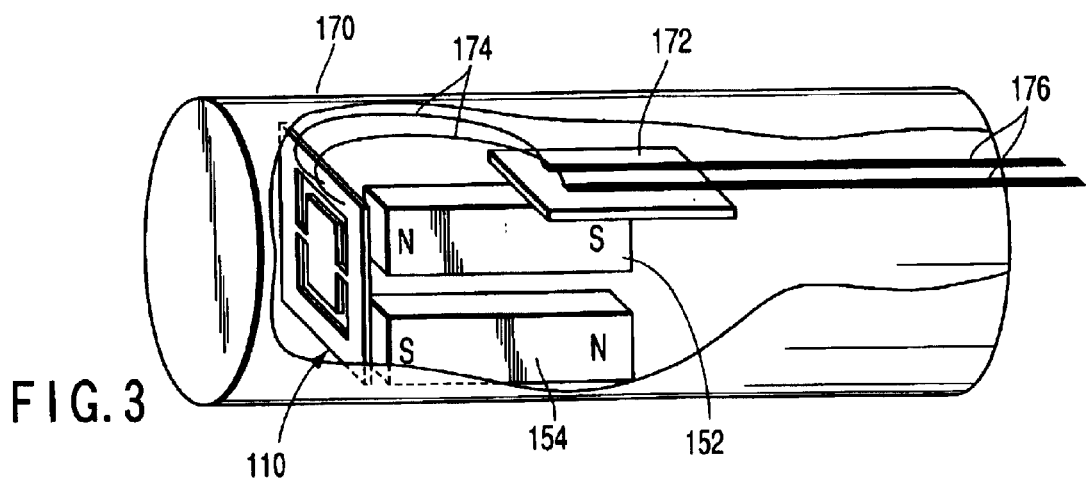
FIG. 3 shows an endoscope tip end into which the optical deflector of FIG. 1 is incorporated as a scanning image pickup unit.

As shown in FIG. 3, the optical deflector 100 is incorporated, for example, as a scanning image pickup unit in an endoscope tip end 170. In this example, an image pickup element is mounted on the movable plate 112 of the oscillating member 110. A wire substrate 172 is contained together in the endoscope tip end 170, the electrode pads of the oscillating member 110 are electrically connected to the wire substrate 172 through bonding wires 174, and wires 176 extending from the wire substrate 172 are connected to an external driving signal supply source (not shown).

The permanent magnets 152, 154 are positioned on the side of the back surface of the movable plate with respect to the oscillating member 110. Furthermore, the permanent magnets 152, 154 are positioned inside the oscillating member 110 in the projection onto the plane parallel to the surface (front or back surface) of the movable plate 112 in the neutral position. Therefore, the optical deflector 100 is suitable for an assembly into a small-diameter tube such as the endoscope tip end.

In the optical deflector 100 of the first embodiment, the permanent magnets 152, 154 are positioned on one side of the oscillating member 110. Therefore, when the present invention is applied to a type for deflecting the light reflected by the movable plate 112, the incident light is not diverted by the permanent magnets 152, 154.

Furthermore, in the projection onto the plane parallel to the surface (front or back surface) of the movable plate 112 in the neutral position, the permanent magnets 152, 154 are not distant from the oscillating member 110, and are positioned inside the oscillating member 110 in a most preferable example. Therefore, an area projected onto the plane is small, and the optical deflector is suitable for the assembly into the small-diameter tube such as the endoscope tip end.

Second Embodiment

The optical deflector according to a second embodiment of the present invention will be described with reference to FIGS. 4 and 5.

Figure 4:
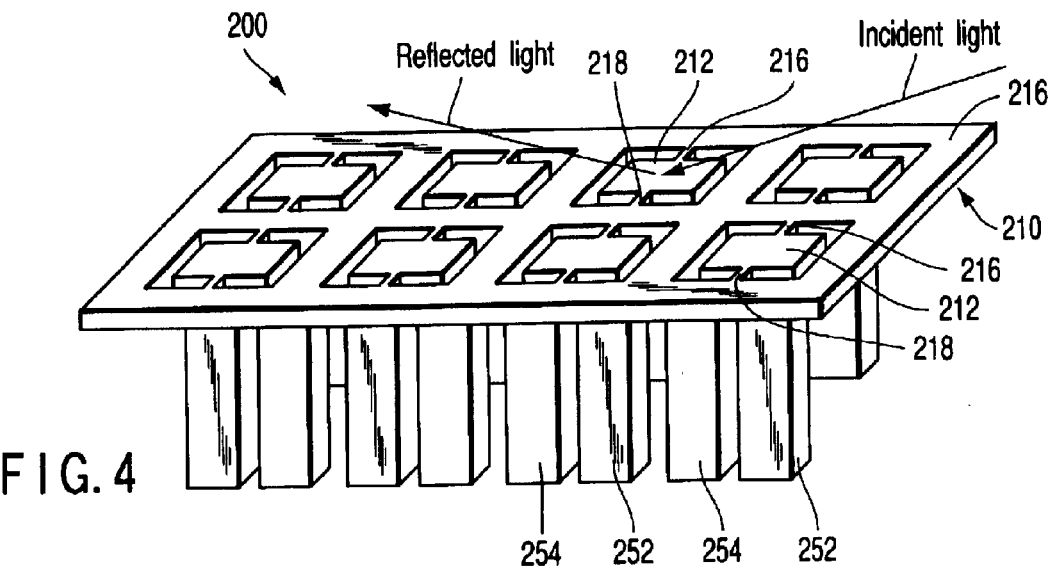
FIG. 4 is a perspective view of the optical deflector according to a second embodiment of the present invention.
Figure 5:
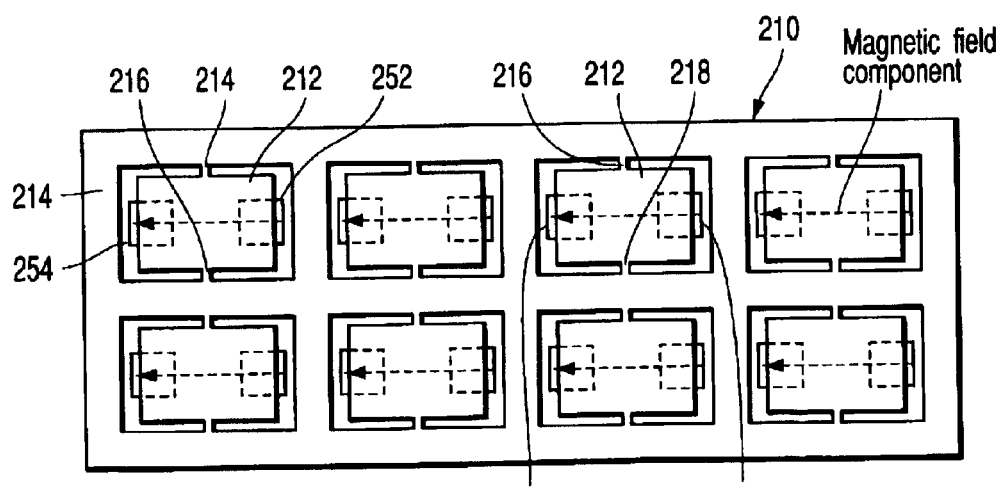
FIG. 5 is a plan view of the optical deflector shown in FIG. 4.

As shown in FIGS. 4 and 5, an optical deflector 200 includes an oscillating member 210 including a plurality of movable plates allowed to oscillate in one dimension. The oscillating member 210 includes a plurality of movable plates 212 aligned in two rows, and a support portion 214 for supporting the movable plates 212. The deflector includes a pair of torsion bars 216, 218, which connect the movable plates 212 to the support portion 214, for each movable plate 212. The torsion bars 216, 218 support the corresponding movable plate 212 with respect to the support portion 214 to allow the plate to oscillate about an axis passed through the torsion bars 216, 218.

Each of the movable plates 212 includes a electromagnetic coil extending along the periphery of the plate, the opposite ends (not shown) of the coil are connected to the wires passed through the torsion bars 216, 218, and the wires are terminated in the electrode pads disposed in the support portion 214.

The oscillating member 210 may be prepared from the semiconductor substrate of silicon by the semiconductor manufacturing technique.

Furthermore, the optical deflector 200 includes magnetic field generation portion for generating the magnetic field, which acts on the electromagnetic coils of the movable plates 212, and the magnetic field generation portion includes two permanent magnets 252, 254 for each movable plate 212. The permanent magnets 252, 254 are positioned on the side of the back surface of the movable plate with respect to the oscillating member 210. The permanent magnets 252, 254 for one movable plate 212 are arranged in parallel with each other, have opposite magnetization directions, and extend in parallel with the normal to the movable plate 212 in the neutral position. As shown in FIG. 5, the permanent magnets 252, 254 provide magnetic field component that cross at right angles to the oscillation axis of the movable plate 212 and extend substantially in parallel with the surface of the movable plate 212.

A structure comprising a movable plate 212, the corresponding pair of torsion bars 216, 218, the corresponding portion of the support portion 214 surrounding the movable plate 212, and the corresponding two permanent magnets 252, 254 for the movable plate 212 constitutes a functional element equivalent to the optical deflector 100 of the first embodiment. In other words, the optical deflector 200 of the second embodiment may also be referred to as an optical deflector array constituted by arranging a plurality of optical deflectors 100 of the first embodiment.

In the optical deflector 200 of the second embodiment, for two surfaces of the movable plate 212 forming the front and back surfaces and extending substantially in parallel with each other, the surface positioned on a side opposite to the permanent magnets 252, 254 functions as a reflective surface. Each of the movable plates 212 is driven in the same manner as the optical deflector 100 of the first embodiment. For example, when a constant current is passed through the electromagnetic coil of the movable plate 212 and the plate is driven, the movable plate 212 is inclined about the oscillation axis passed through the torsion bars 216, 218 by any angle. Thereby, the light reflected by the movable plate 212 can be reflected one-dimensionally in a desired direction to provide optical connection, and the like.

In the optical deflector 200 of the second embodiment, the permanent magnets 252, 254 are arranged on one side of the oscillating member 210. Thereby, since the permanent magnets 252, 254 do not project from the reflective surface of the movable plate 212 in the neutral position, the incident light upon the reflective surface of the movable plate 212 is not diverted. Moreover, since the permanent magnets 252, 254 do not exist beside the movable plate 212, a plurality of movable plates 212 can be arranged in the vicinity of one another. That is, an array density can be raised.

Third Embodiment

The optical deflector according to a third embodiment of the present invention will be described with reference to FIGS. 6 to 8.

Figure 6:
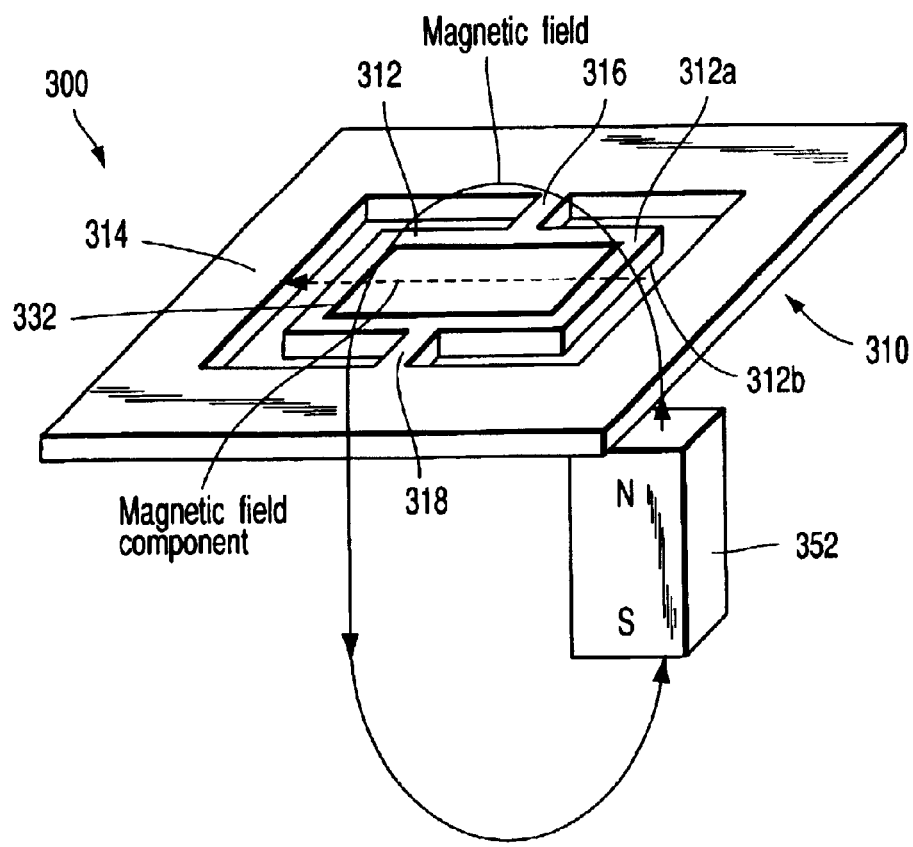
FIG. 6 is a perspective view of the optical deflector according to a third embodiment of the present invention.
Figure 7:
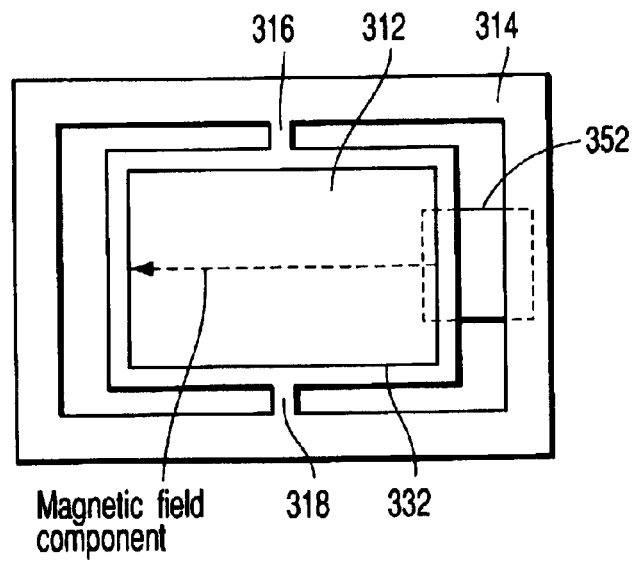
FIG. 7 is a plan view of the optical deflector shown in FIG. 6.

As shown in FIGS. 6 and 7, an optical deflector 300 comprises an oscillating member 310 including a movable plate allowed to oscillate in one dimension. The oscillating member 310 is the same structure as the oscillating member 110 of the first embodiment. In the drawings, the elements of the oscillating member 310 equivalent to the elements of the oscillating member 110 are denoted with the same last two digits of each reference numeral, and detailed description thereof is omitted to avoid redundancy.

The optical deflector 300 includes a permanent magnet 352 as the magnetic field generation portion for generating the magnetic field which acts on an electromagnetic coil 332. As shown in FIG. 7, the permanent magnet 352 is off the oscillation axis of the an movable plate 312 in the projection onto the imaginary plane parallel to the surface (front surface 312a or back surface 312b) of the electromagnetic coil 132 in the neutral position. The permanent magnet 352 preferably crosses the contour of the oscillating member 310 in the above-described projection, and is more preferably positioned in the contour of the oscillating member 310. That is, preferably the permanent magnet 352 is not distant from the oscillating member 310 in the projection.

As shown in FIG. 6, the permanent magnet 352 generates a magnetic field, which expands radially from an N pole and reaches an S pole on the opposite side. As shown in FIGS. 6 and 7, the magnetic field provides a magnetic field component that crosses the oscillation axis passed through torsion bars 316, 318 and extends in parallel with the surface of the movable plate 312.

Figure 8:
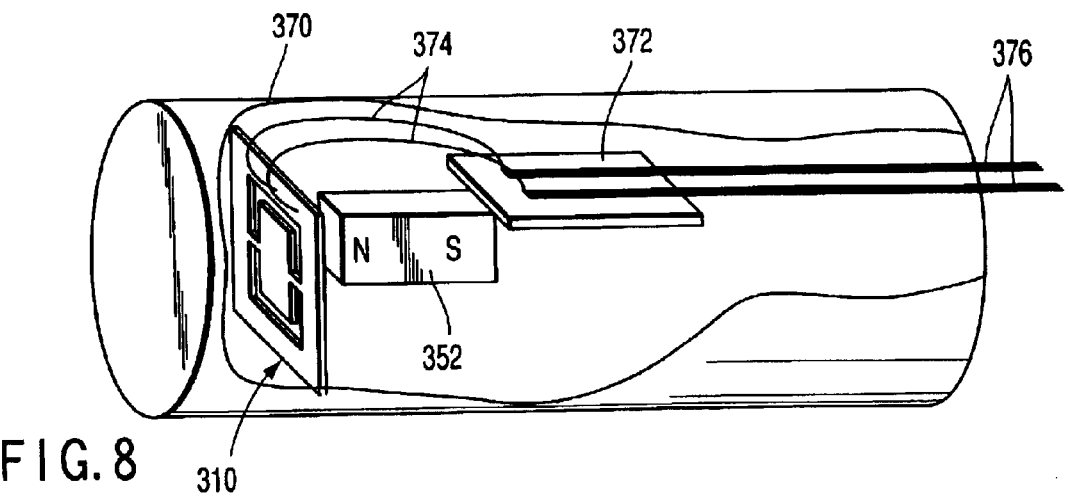
FIG. 8 shows the endoscope tip end into which the optical deflector of FIG. 6 is incorporated as the scanning image pickup unit.

As shown in FIG. 8, the optical deflector 300 is incorporated, for example, as the scanning image pickup unit in an endoscope tip end 370. In this example, the image pickup element is disposed in the movable plate 312 of the oscillating member 310. A wire substrate 372 is contained together in the endoscope tip end 370, the electrode pads of the oscillating member 310 are electrically connected to the wire substrate 372 through bonding wires 374, and wires 376 extending from the wire substrate 372 are connected to the external driving signal supply source (not shown).

The permanent magnet 352 is positioned on the side of the back surface of the movable plate with respect to the oscillating member 310. Furthermore, the permanent magnet is positioned inside the oscillating member 310 in the projection onto the oscillating member 310. Therefore, the optical deflector 300 is suitable for the assembly into the small-diameter tube such as the endoscope tip end.

In addition to the advantage of the optical deflector 100 of the first embodiment, the optical deflector 300 of the third embodiment, in which the magnetic field generation portion comprises one permanent magnet, is easy in assembling and low in cost as compared with the first embodiment. Moreover, as compared with the first embodiment, since the occupied space is small. With the assembly into the endoscope tip end 370, there is provided much space, in which other members can be disposed.

Fourth Embodiment

The optical deflector according to a fourth embodiment of the present invention will be described with reference to FIGS. 9 and 10.

Figure 9:
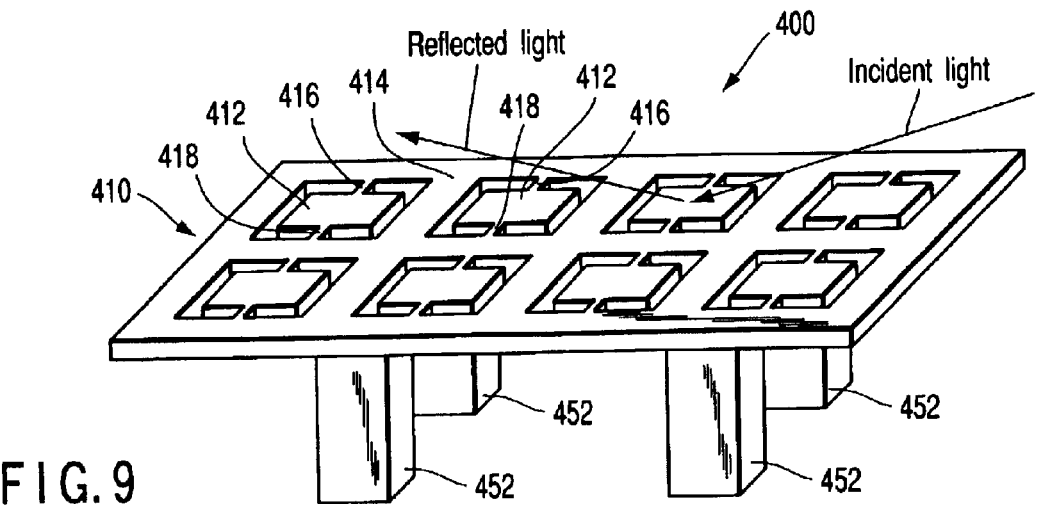
FIG. 9 is a perspective view of the optical deflector according to a fourth embodiment of the present invention.
Figure 10:
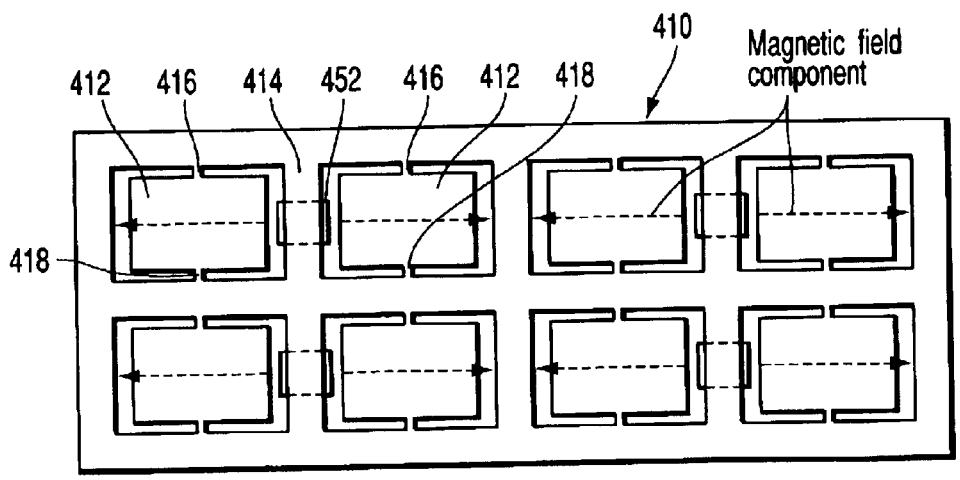
FIG. 10 is a plan view of the optical deflector shown in FIG. 9.

As shown in FIGS. 9 and 10, an optical deflector 400 includes an oscillating member 410 including eight movable plates allowed to oscillate in one dimension and which are aligned in two rows. The oscillating member 410 is the same structure as the oscillating member 210 of the second embodiment. In the drawings, the elements of the oscillating member 410 equivalent to the elements of the oscillating member 210 are denoted with the same last two digits of each reference numeral, and the detailed description thereof is omitted to avoid redundancy.

Furthermore, the optical deflector 400 includes the magnetic field generation portion for generating the magnetic field which acts on the electromagnetic coils of movable plates 412, and the magnetic field generation portion includes one permanent magnet 452 for each two movable plates 412 aligned crossing at right angles to the oscillation axis. That is, the magnetic field generation portion includes four permanent magnets 452 for eight movable plates 412. The permanent magnets 452 are positioned on the side of the back surface of the movable plate with respect to the oscillating member 410 as shown in FIG. 9.

As shown in FIG. 10, the permanent magnet 452 is positioned in a middle between the two movable plates 412 aligned crossing at right angles to the oscillation axis in the projection onto the imaginary plane parallel to the surface (front or back surface) of the movable plate 412. That is, the two movable plates 412 aligned crossing at right angles to the oscillation axis are symmetrically positioned with respect to the permanent magnet 452. The permanent magnet 452 provides a magnetic field component crossing at right angles to the oscillation axis of the movable plate 412 and extending substantially in parallel with the surface of the movable plate 412 to the movable plates 412 aligned crossing at right angles to the oscillation axis.

A structure comprising movable plate 412, the corresponding pair of torsion bars 416, 418, the corresponding portion of a support portion 414 positioned around the movable plate 412, and the corresponding permanent magnet 452 for the movable plate 412 constitutes a functional element equivalent to the optical deflector 300 of the third embodiment. In other words, the optical deflector 400 of the fourth embodiment may also be referred to as the optical deflector array constituted by arranging a plurality of optical deflectors 300 of the third embodiment. In the optical deflector array, the optical deflectors 300 of the third embodiment are arranged, and additionally the permanent magnet is shared by the adjacent two optical deflectors 300, so that the number of permanent magnets is reduced.

In the optical deflector 400 of the fourth embodiment, in two surfaces of the movable plate 412 forming the front and back surfaces and extending substantially in parallel with each other, the surface positioned on the side opposite to the permanent magnet 452 functions as the reflective surface. Each of the movable plates 412 is driven in the same manner as the optical deflector 100 of the first embodiment. For example, when the constant current is passed through the electromagnetic coil of the movable plate 412 and the plate is driven, the movable plate 412 is inclined about the oscillation axis passed through the torsion bars 416, 418 at any angle. Thereby, the reflected light reflected by the movable plate 412 can be reflected in one dimension in a desired direction to provide optical connection, and the like.

The optical deflector 400 of the fourth embodiment has advantages similar to those of the optical deflector 200 of the second embodiment. Furthermore, the optical deflector 400 of the fourth embodiment has a small number of permanent magnets constituting the magnetic field generation portion as compared with the second embodiment, and is therefore easy to assemble and low in cost.

Fifth Embodiment

The optical deflector according to a fifth embodiment of the present invention will be described with reference to FIGS. 11 to 13.

Figure 11:
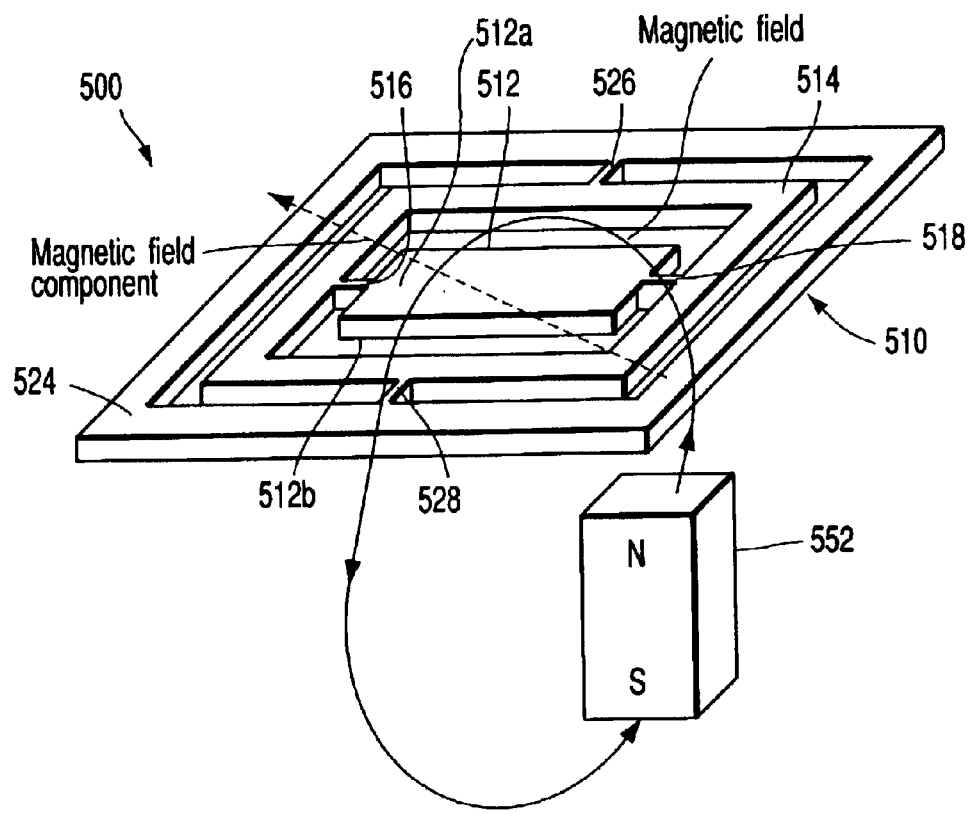
FIG. 11 is a perspective view of the optical deflector according to a fifth embodiment of the present invention.
Figure 12:
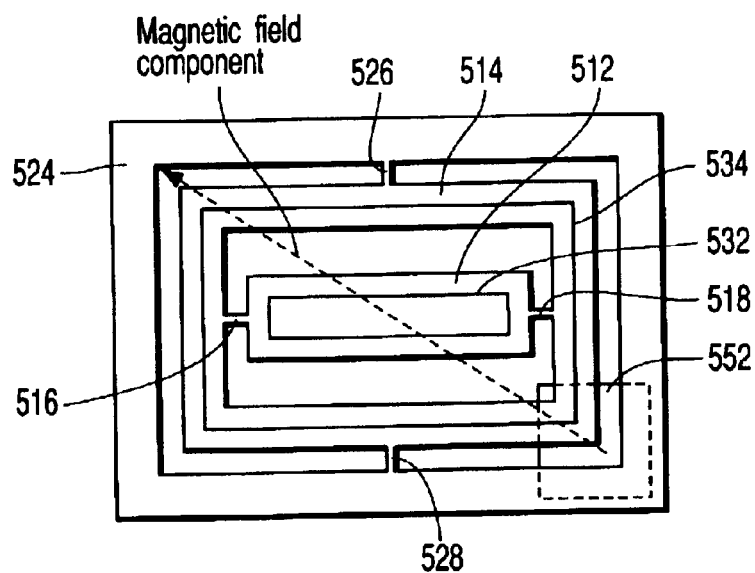
FIG. 12 is a plan view of the optical deflector shown in FIG. 11.

As shown in FIGS. 11 and 12, an optical deflector 500 includes an oscillating member 510 including a movable plate allowed to oscillate in two dimensions. The oscillating member 510 includes a movable plate 512, a movable frame 514 for supporting the movable plate 512 in a middle, a pair of torsion bars 516, 518 which connect the movable plate 512 to the movable frame 514, a frame-shaped support portion 524 for supporting the movable frame 514, and a pair of torsion bars 526, 528 which connect the movable frame 514 to the support portion 524.

The torsion bars 516, 518 support the movable plate 512 with respect to the movable frame 514 so as to allow the plate to oscillate about an axis passed through the torsion bars 516, 518. Moreover, the torsion bars 526, 528 support the movable frame 514 with respect to support portion 524 so as to allow the frame to oscillate about an axis passed through the torsion bars 526, 528. The axis of the torsion bars 516, 518 crosses at right angles to the axis of the torsion bars 526, 528.

Therefore, the movable plate 512 is allowed to oscillate with respect to the movable frame 514 about an axis passed through the pair of torsion bars 516, 518, and the movable plate 512 is allowed to oscillate together with the movable frame 514 about an axis passed through the pair of torsion bars 526, 528 with respect to the support portion 524. That is, the movable plate 512 is allowed to oscillate with respect to the support portion 524 in two dimensions.

As shown in FIG. 12, the movable plate 512 includes an electromagnetic coil 532 extending along the periphery of the plate. Moreover, the movable frame 514 includes an electromagnetic coil 534 extending along the frame so as to encircle the movable plate 512. FIG. 12 schematically shows the electromagnetic coils 532 and 534 as the sides of the quadrangles so as to show the coils going around. However, actually, as not shown, the electromagnetic coil 532 is electrically connected to the electrode pads disposed on the support portion 524 via the wires extending through the torsion bars 516, 518, movable frame 514, and torsion bars 526, 528. The electromagnetic coil 534 is electrically connected to the electrode pads disposed on the support portion 524 via the wires extending through the torsion bars 526, 528.

The oscillating member 510 may be prepared from the semiconductor substrate of silicon by the semiconductor manufacturing technique.

The optical deflector 500 further includes a permanent magnet 552 as the magnetic field generation portion for generating the magnetic field, which acts on the electromagnetic coil 532.

The movable plate 512 includes a first surface (e.g., the front surface) 512a and a second surface (e.g., the back surface) 512b, which form the front and back surfaces and extend substantially in parallel with each other. For example, a light emitting element such as a semiconductor laser, which emits a light beam, is attached to the first surface 512a of the movable plate 512. Thereby, the light beam emitted from the light emitting element is deflected in accordance with the oscillation of the movable plate 512.

Alternatively, the first surface 512a of the movable plate 512 may function as the reflective surface, or a reflective mirror may be disposed on the first surface 512a of the movable plate 512. Thereby, a light beam reflected by the movable plate 512 is deflected in accordance with the oscillation of the movable plate 512.

As seen from FIG. 11, for two spaces divided by an imaginary plane including the front surface 512a of the movable plate 512 in the neutral position, one including the second surface 512b of the movable plate 512, and the other not including the second surface 512b, the permanent magnet 552 is positioned in the space including at least the second surface 512b of the movable plate 512. More preferably, for two spaces divided by an imaginary plane including the second surface 512b of the movable plate 512 in the neutral position, the permanent magnet 552 is positioned in the space not including the first surface 512a of the movable plate 512. Briefly speaking, the permanent magnet 552 is positioned on the side of the back surface of the movable plate with respect to the oscillating member 510.

Furthermore, as shown in FIG. 12, the permanent magnet 552 is off both of the oscillation axes passed through the torsion bars 516, 518 and torsion bars 526, 528 in the projection onto the imaginary plane parallel to the first surface 512a of the movable plate 512 in the neutral position. In the above-described projection, the permanent magnet 552 preferably crosses the contour of the oscillating member 510, and is more preferably positioned inside the contour of the oscillating member 510.

The magnetization direction of the permanent magnet 552 is parallel to the normal to the surface of the movable plate 512 in the neutral position.

As shown in FIG. 11, the permanent magnet 552 generates the magnetic field which radially expands from the N pole and reaches the S pole on the opposite side. As shown in FIGS. 11 and 12, the magnetic field provides the magnetic field component that crosses both the oscillation axes passed through the torsion bars 516, 518 and 526, 528 and extends in parallel with the surface (the front or back surface) of the movable plate 512.

As easily seen from the description of the operation of the optical deflector of the first embodiment, the movable plate 512 is oscillated about the oscillation axis passed through the torsion bars 516, 518 by the Lorentz force received by the current flowing through the electromagnetic coil 532. The plate is oscillated about the oscillation axis passed through the torsion bars 526, 528 by the Lorentz force received by the current flowing through the electromagnetic coil 534.

Figure 13:
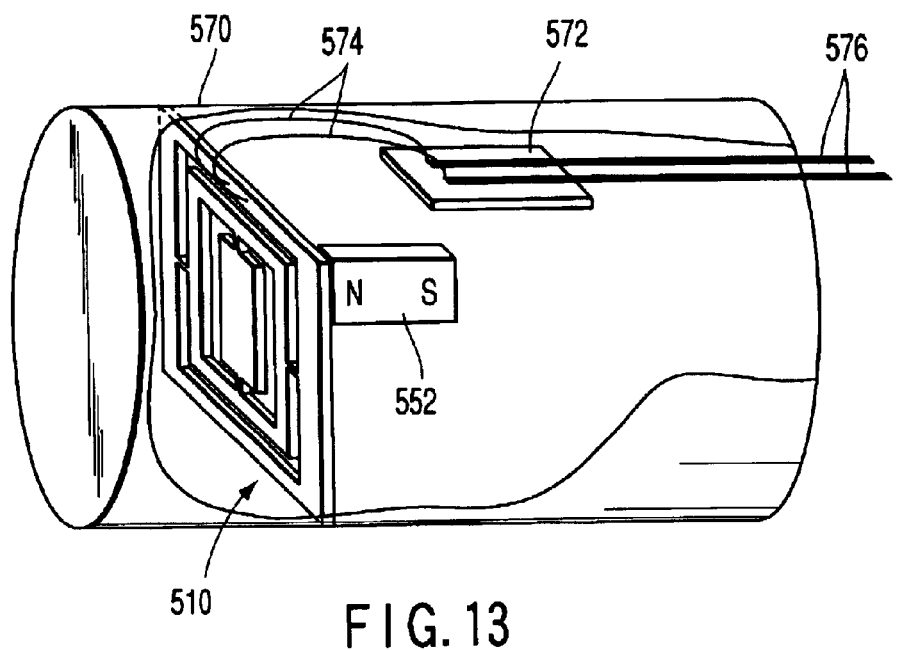
FIG. 13 shows the endoscope tip end into which the optical deflector of FIG. 11 is incorporated as the scanning image pickup unit.

As shown in FIG. 13, the optical deflector 500 is assembled, for example, as the scanning image pickup unit in an endoscope tip end 570. In this example, the image pickup element is disposed in the movable plate 512 of the oscillating member 510. A wire substrate 572 is contained together in the endoscope tip end 570, the electrode pads of the oscillating member 510 are electrically connected to the wire substrate 572 through bonding wires 574, and wires 576 extending from the wire substrate 572 are connected to the external driving signal supply source (not shown).

The permanent magnet 552 is positioned on the side of the back surface of the movable plate with respect to the oscillating member 510. Furthermore, since the permanent magnet 552 is positioned inside the oscillating member 510 in the projection onto the oscillating member 510, the optical deflector 500 is suitable for the assembly into the small-diameter tube such as the endoscope tip end.

The optical deflector 500 of the fifth embodiment is positioned on one side of the oscillating member 510 of the permanent magnet 552. Furthermore, in the projection onto the imaginary plane parallel to the surface (front or back surface) of the movable plate 512 in the neutral position, the permanent magnet 552 is not distant from the oscillating member 510, and is positioned inside the oscillating member 510 in the most preferable example. Therefore, the area projected onto the plane is small, and the optical deflector is suitable for the assembly into the small-diameter tube such as the endoscope tip end.

For the optical deflector 500 of the fifth embodiment, the permanent magnet 552 is positioned on one side of the oscillating member 510. Therefore, when the deflector is applied to the type for deflecting the light reflected by the movable plate 512, the incident light is not diverted by the permanent magnet 552.

Furthermore, in the projection onto the plane parallel to the surface (front or back surface) of the movable plate 512 in the neutral position, the permanent magnet 552 is not distant from the oscillating member 510, and is positioned inside the oscillating member 510 in the most preferable example. Therefore, the area projected onto the plane is small, and the optical deflector is suitable for the assembly into the small-diameter tube such as the endoscope tip end.

Sixth Embodiment

The optical deflector according to a sixth embodiment of the present invention will be described with reference to FIGS. 14 and 15.

Figure 14:
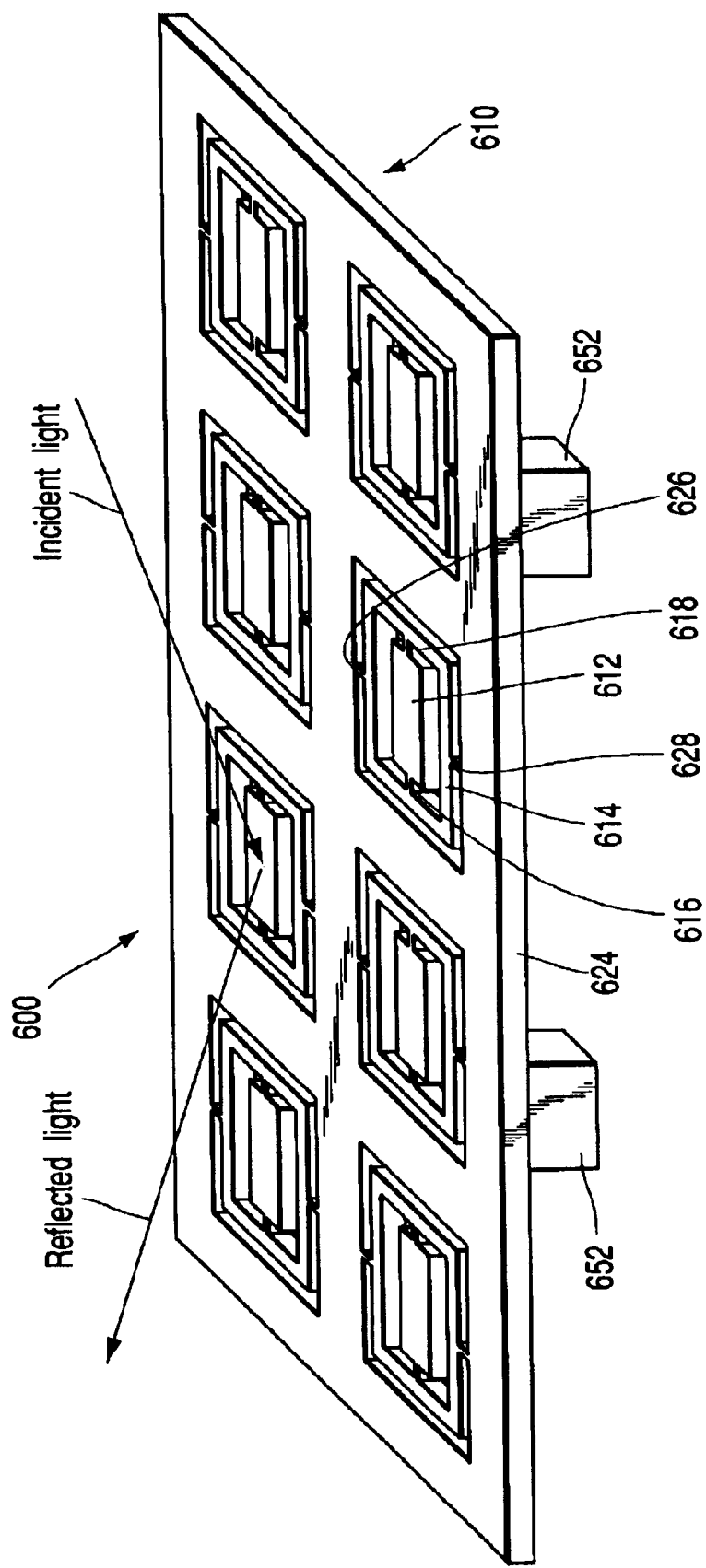
FIG. 14 is a perspective view of the optical deflector according to a sixth embodiment of the present invention.

As shown in FIGS. 14 and 15, an optical deflector 600 includes an oscillating member 610 including a plurality of movable plates allowed to oscillate in two dimensions. The oscillating member 610 includes eight movable plates 612 aligned in two rows, eight movable frames 614 for supporting the movable plates 612 in the middle, and a support portion 624 for supporting the movable frames 614. For one set of the movable plate 612 and movable frame 614, the optical deflector includes a pair of torsion bars 616, 618, which connect the movable plate 612 to the movable frame 614. For one movable frame 614, the optical deflector includes a pair of torsion bars 626, 628, which connect the movable frame 614 to the support portion 624.

The torsion bars 616, 618 support the corresponding movable plate 612 so as to allow the plate to oscillate with respect to the movable frame 614 about an axis passed through the torsion bars 616, 618. Moreover, the torsion bars 626, 628 support the corresponding movable frame 614 so as to allow the frame to oscillate with respect to the support portion 624 about an axis passed through the torsion bars 626, 628. The oscillation axis passed through the torsion bars 616, 618 crosses at right angles to the oscillation axis passed through the torsion bars 626, 628.

Therefore, the movable plate 612 is allowed to oscillate about an axis passed through the torsion bars 616, 618 with respect to the movable frame 614. Moreover, the movable plate 612 is allowed to oscillate together with the movable frame 614 about an axis passed through the torsion bars 626, 628 with respect to the support portion 624. That is, the movable plate 612 is allowed to oscillate in two dimensions with respect to the support portion 624.

As not shown, the movable plate 612 includes an electromagnetic coil extending along the periphery of the plate, and the movable frame 614 includes an electromagnetic coil extending along the frame so as to encircle the movable plate 614. The electromagnetic coil extending along the periphery of the movable plate 612 is electrically connected to the electrode pads disposed on the support portion 624 through wires extending through the torsion bars 616, 618, movable frame 614, and torsion bars 626, 628. Moreover, the electromagnetic coil extending along the movable frame 614 is similarly connected through wires extending through the torsion bars 626, 628.

The oscillating member 610 may be prepared from the semiconductor substrate of silicon by the semiconductor manufacturing technique.

The optical deflector 600 further includes the magnetic field generation portion for generating the magnetic field, which acts on the electromagnetic coil of the movable plate 612, and the magnetic field generation portion includes one permanent magnet 652 for each four movable plates 612 arranged lengthwise and crosswise. That is, the magnetic field generation portion includes two permanent magnets 652 with respect to eight movable plates 612. The permanent magnets 652 are positioned on the side of the back surface of the movable plate with respect to the oscillating member 610.

As shown in FIG. 15, the permanent magnet 652 is positioned in the middle of four movable plates 612 arranged lengthwise and crosswise in the projection onto the imaginary plane parallel to the surface (front or back surface) of the movable plate 612. That is, the four movable plates 612 arranged in two rows are symmetrically positioned with respect to the permanent magnet 652. The permanent magnet 652 provides the magnetic field component that crosses both the oscillation axes passed through the pairs of torsion bars 616, 618 and torsion bars 626, 628 with respect to the four movable plates 612 positioned around the magnet and arranged lengthwise and crosswise and which extends substantially in parallel with the surface of the movable plate 612.

A structure comprising a movable plate 612, the corresponding pair of torsion bars 616, 618, the corresponding movable frame 614 positioned around the movable plate 612, the corresponding pair of torsion bars 626, 628 for the movable frame 614, the corresponding portion of the support portion 624 surrounding the movable frame 614, and the corresponding permanent magnet 652 for the movable plate 612 constitutes a functional element equivalent to the optical deflector 500 of the fifth embodiment. In other words, the optical deflector 600 of the sixth embodiment may also be referred to as the optical deflector array constituted by arranging a plurality of optical deflectors 500 of the fifth embodiment. In the optical deflector array, the optical deflectors 500 of the fifth embodiment are arranged, and additionally the permanent magnet is shared by four optical deflectors 500 disposed adjacent to one another, so that the number of permanent magnets is reduced.

In the optical deflector 600 of the sixth embodiment, for two surfaces of the movable plate 612 forming the front and back surfaces and extending substantially in parallel with each other, the surface positioned on the side opposite to the permanent magnet 652 functions as the reflective surface. Each of the movable plates 612 is driven in the same manner as the optical deflector 500 of the fifth embodiment. For example, when the constant current is passed through the electromagnetic coil of the movable plate 612 and the plate is driven, the movable plate 612 is inclined about the oscillation axes passed through the torsion bars 616, 618 and 626, 628 at any angle. Thereby, the reflected light reflected by the movable plate 612 can be reflected in two dimensions in a desired direction to provide optical connection, and the like.

In the optical deflector 600 of the sixth embodiment, the permanent magnet 652 is disposed on one side of the oscillating member 610. Thereby, since the permanent magnet 652 does not project from the reflective surface of the movable plate 612 in the neutral position, the incident light upon the reflective surface of the movable plate 612 is not diverted. Moreover, since the permanent magnet 652 does not exist beside the movable plate 612, a plurality of movable plates 612 can be arranged in the vicinity of one another.

Seventh Embodiment

The optical deflector according to a seventh embodiment of the present invention will be described with reference to FIGS. 16 to 18.

Figure 16:
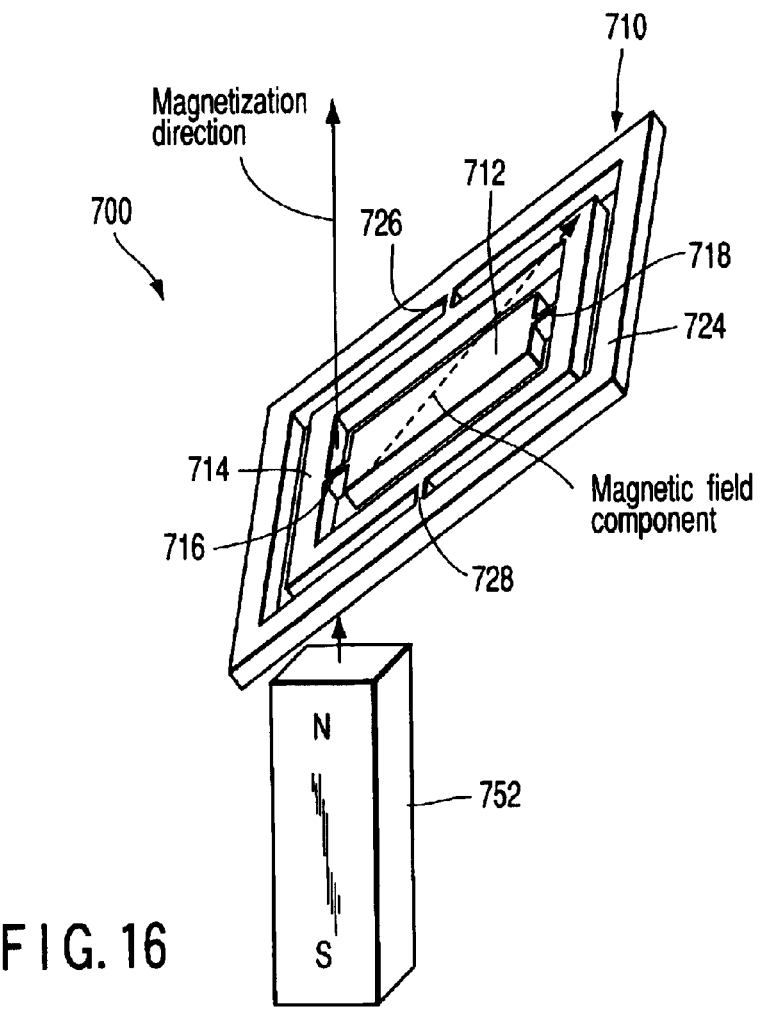
FIG. 16 is a perspective view of the optical deflector according to a seventh embodiment of the present invention.
Figure 17:
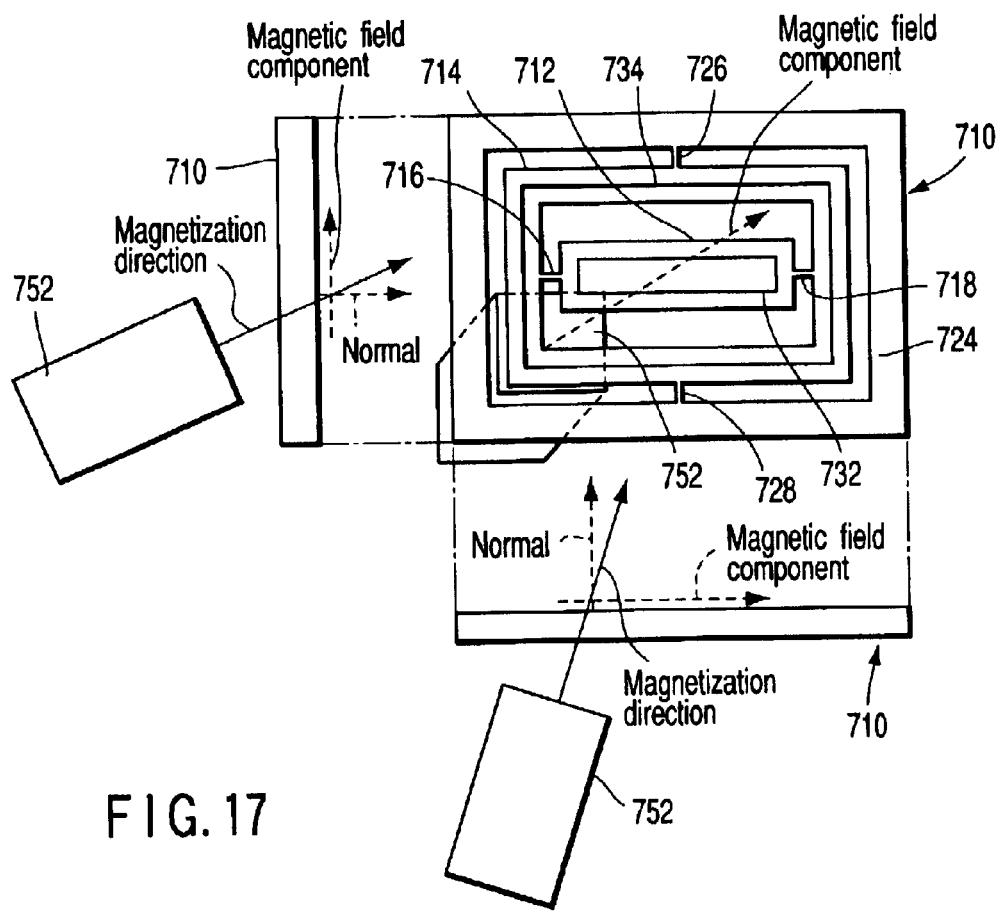
FIG. 17 is a three-surfaces view of the optical deflector shown in FIG. 16.

As shown in FIGS. 16 and 17, an optical deflector 700 includes an oscillating member 710 including a movable plate allowed to oscillate in two dimensions. The oscillating member 710 is the same structure as the oscillating member 510 of the fifth embodiment. In the drawings, the elements of the oscillating member 710 equivalent to the elements of the oscillating member 510 are denoted with the same last two digits of each reference numeral, and the detailed description thereof is omitted to avoid redundancy.

The optical deflector 700 further includes a permanent magnet 752 as the magnetic field generation portion for generating the magnetic field which acts on electromagnetic coils 732, 734. As shown in FIG. 17, the permanent magnet 752 is off both of the oscillation axes passed through the torsion bars 716, 718 and 726, 728 in the projection onto the imaginary plane parallel to the surface (front or back surface) of the movable plate 712 in the neutral position. The permanent magnet 752 preferably crosses the contour of the oscillating member 710 in the above-described projection, and is more preferably positioned inside the contour of the oscillating member 710.

The magnetization direction of each permanent magnet 752 is non-parallel to the normal to the movable plate 712 in the neutral position, and has an inclination. Moreover, in the projection onto the imaginary plane crossing at right angles to the magnetization direction of the permanent magnet 752, as shown in FIG. 17, the permanent magnet 752 is positioned inside the oscillating member 710.

The permanent magnet 752 generates the magnetic field, which expands radially from the N pole and reaches the S pole on the opposite side. As shown in FIGS. 16 and 17, the magnetic field provides a magnetic field component that crosses both the oscillation axes passed through torsion bars 716, 718 and 726, 728 and extends in parallel with the surface of the movable plate 712.

As easily seen from the description of the operation of the optical deflector of the first embodiment, the movable plate 712 is oscillated about the oscillation axis passed through the torsion bars 716, 718 by the Lorentz force received by the current flowing through the electromagnetic coil 732. The plate is also oscillated about the oscillation axis passed through the torsion bars 726, 728 by the Lorentz force received by the current flowing through the electromagnetic coil 734.

Figure 18:
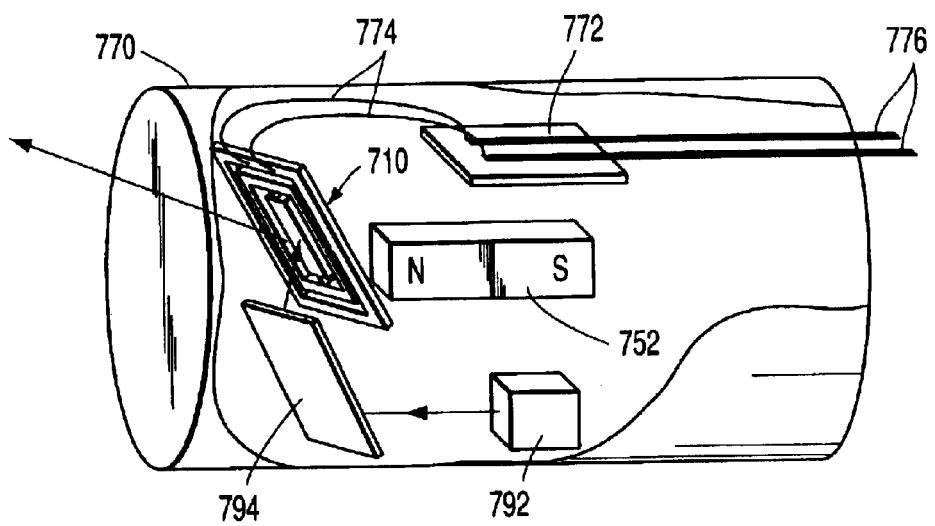
FIG. 18 shows the endoscope tip end into which the optical deflector of FIG. 16 is incorporated as the scanning image pickup unit.

As shown in FIG. 18, the optical deflector 700 is assembled, for example, as the scanning image pickup unit in an endoscope tip end 770. In this example, the movable plate 712 of the oscillating member 710 functions as the reflective surface. For the optical deflector 700, the magnetization direction of the permanent magnet 752 is disposed in parallel with the axis of the endoscope tip end 770. Therefore, the oscillating member 710 is disposed such that the normal to the surface of the movable plate 712 in the neutral position has an inclination with respect to the axis of the endoscope tip end 770.

A wire substrate 772 is contained together in the endoscope tip end 770, the electrode pads of the oscillating member 710 are electrically connected to the wire substrate 772 through bonding wires 774, and wires 776 extending from the wire substrate 772 are connected to the external driving signal supply source (not shown).

Furthermore, a light source 792 for emitting the light, and a mirror 794 for deflecting the light from the light source 792 toward the oscillating member 710 are arranged in the endoscope tip end 770. The light emitted from the light source 792 is reflected by the mirror 794, subsequently reflected by the movable plate 712 of the oscillating member 710, and emitted outwards from a front end surface of the endoscope tip end 770. The light emitted from the front end surface of the endoscope tip end 770 is scanned in two dimensions in accordance with the two-dimensional oscillation of the movable plate 712 of the oscillating member 710. When a condensing lens is disposed on an optical axis, a condensed light spot is scanned in two dimensions.

In this example, the light source 792 is disposed in the endoscope tip end 770, but the light source may also be disposed outside the endoscope tip end 770. In this case, the light from the light source may be guided into the endoscope tip end 770 by the light guide technique such as an optical fiber, and emitted from the tip end.

In the optical deflector 700 of the seventh embodiment, the permanent magnet 752 is positioned on one side of the oscillating member 710. Therefore, when the present invention is applied to the type for deflecting the light reflected by the movable plate 712, the incident light is not diverted by the permanent magnet 752.

Furthermore, in the projection onto the plane parallel to the surface (front or back surface) of the movable plate 712 in the neutral position, the permanent magnet 752 is not distant from the oscillating member 710, and is positioned inside the oscillating member 710 in the most preferable example. Therefore, the area projected onto the plane is small, and the optical deflector is suitable for the assembly into the small-diameter tube such as the endoscope tip end.

Eighth Embodiment

The optical deflector according to an eighth embodiment of the present invention will be described with reference to FIGS. 19 and 20.

Figure 19:
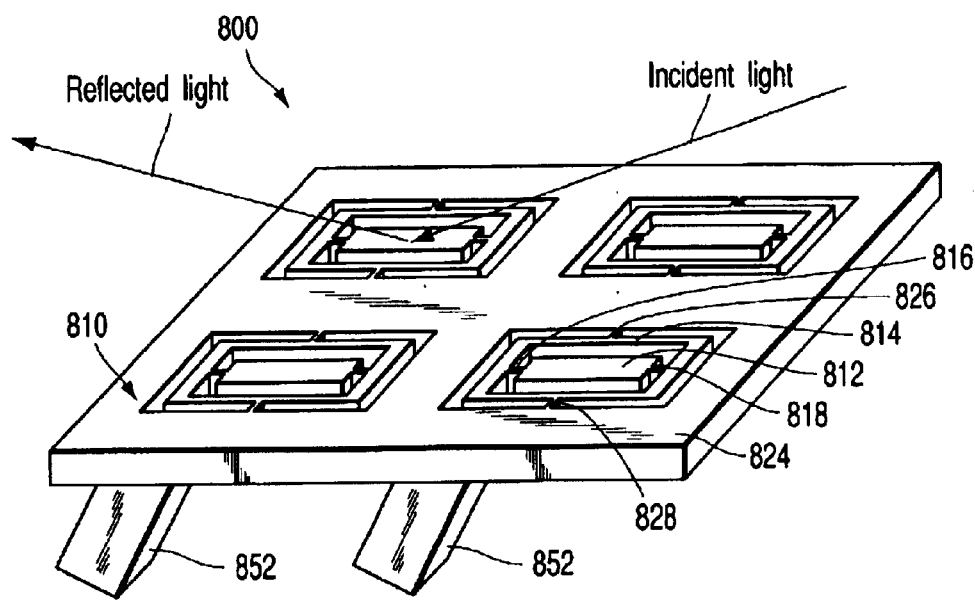
FIG. 19 is a perspective view of the optical deflector according to an eighth embodiment of the present invention.
Figure 20:
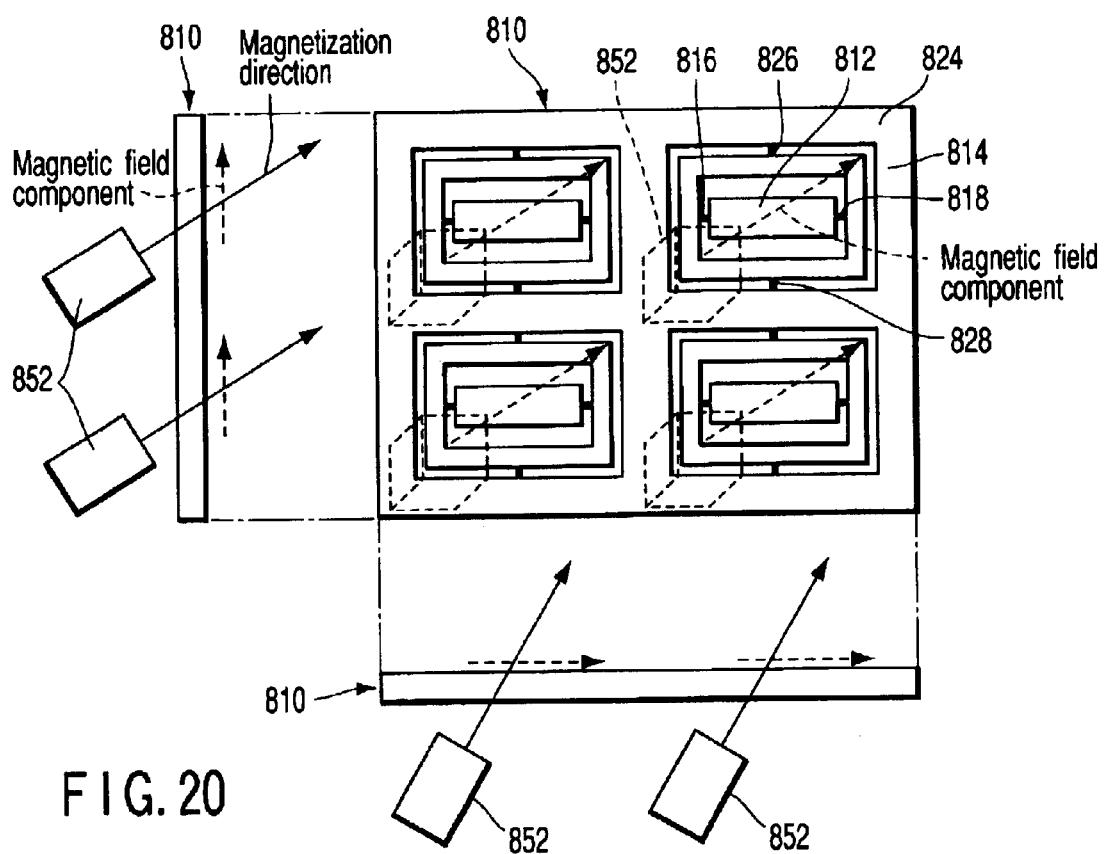
FIG. 20 is a three-surfaces view of the optical deflector shown in FIG. 19.

As shown in FIGS. 19 and 20, an optical deflector 800 includes an oscillating member 810 including four movable plates allowed to oscillate in two dimensions and are arranged in two rows. The oscillating member 810 is basically the same structure as the oscillating member 610 of the sixth embodiment except in the number of movable plates. In the drawings, the elements of the oscillating member 810 equivalent to the elements of the oscillating member 610 are denoted with the same last two digits of each reference numeral, and the detailed description thereof is omitted to avoid redundancy.

The optical deflector 800 further includes a magnetic field generation portion for generating the magnetic field, which acts on the electromagnetic coils of movable plates 812, and the magnetic field generation portion includes one permanent magnet 852 with respect to one movable plate 812. That is, the magnetic field generation portion includes four permanent magnets 852 for the four movable plates 812. As shown in FIG. 19, the permanent magnets 852 are positioned on the side of the back surface of the movable plate with respect to the oscillating member 810.

As shown in FIG. 20, the permanent magnets 852 are off both of the oscillation axes passed through torsion bars 816, 818 and 826, 828 in the projection onto the imaginary plane parallel to the surface (front or back surface) of the movable plate 812 in the neutral position. In the projection, the permanent magnets 852 preferably cross the contour of the oscillating member 810, and are more preferably positioned inside the contour of the oscillating member 810.

The magnetization direction of each permanent magnet 852 is non-parallel to the normal to the surface of the movable plate 812 in the neutral position, and has an inclination.

The permanent magnet 852 generates the magnetic field, which expands radially from the N pole and reaches the S pole on the opposite side. As shown in FIG. 20, the magnetic field provides a magnetic field component that crosses both the oscillation axes passed through the torsion bars 816, 818 and 826, 828 and extends in parallel with the surface of the movable plate 812.

A structure comprising a movable plate 812, the corresponding pair of torsion bars 816, 818, the corresponding portion of a support portion 814 positioned around the movable plate 812, and the permanent magnet 852 for the movable plate 812 constitutes the function member equivalent to the optical deflector 700 of the seventh embodiment. In other words, the optical deflector 800 of the eighth embodiment may also be referred to as the optical deflector array constituted by arranging a plurality of optical deflectors 700 of the seventh embodiment.

In the optical deflector 800 of the eighth embodiment, for two surfaces of the movable plate 812 which form the front and back surfaces and extend substantially in parallel with each other, the surface positioned on the side opposite to the permanent magnet 852 functions as the reflective surface. Each of the movable plates 812 is driven in the same manner as the optical deflector 500 of the fifth embodiment. For example, when the constant current is passed through the electromagnetic coil of the movable plate 812 and the plate is driven, the movable plate 812 is inclined about the oscillation axis passed through the torsion bars 816, 818 at any angle. Thereby, the reflected light reflected by the movable plate 812 can be reflected in one dimension in a desired direction to provide the optical connection, and the like.

The optical deflector 800 of the eighth embodiment has advantages similar to those of the optical deflector 600 of the sixth embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical deflector comprising:
an oscillating member including a movable plate allowed to oscillate in at least one dimension, the oscillating member having a first oscillation axis, about which the movable plate is allowed to oscillate, and the movable plate including a coil extending along the periphery of the movable plate; and
a magnetic field generator generating a magnetic field, which interacts with a current flowing through the coil to generate a force that oscillates the movable plate about the first oscillation axis,
wherein the movable plate has first and second surfaces forming front and back surfaces, respectively, and extending substantially parallel with each other, wherein an imaginary plane including the second surface of the movable plate in a neutral position defines two spaces, one space including the first surface of the movable plate and a second space not including the first surface, wherein the magnetic field generator is positioned in the second space, and the magnetic field generator at least partially overlaps with the oscillating member and is off the first oscillation axis of the movable plate in a projection onto an imaginary plane parallel to the second surface of the movable plate in the neutral position.

2. The optical deflector according to claim 1, wherein the oscillating member has one movable plate, the movable plate is allowed to oscillate about the oscillation axis, and the magnetic field generator includes two permanent magnets, which are off the oscillation axis, and symmetrically positioned with respect to a center of the movable plate, in a projection onto an imaginary plane parallel to the first surface of the movable plate in the neutral position, so as to provide a magnetic field component that crosses the oscillation axis.

3. The optical deflector according to claim 2, wherein a magnetization direction of the permanent magnets are non-parallel to the normal to the first surface of the movable plate.

4. The optical deflector according to claim 1, wherein the oscillating member has one movable plate, the movable plate is allowed to oscillate about the oscillation axis, and the magnetic field generator includes one permanent magnet, which is off the oscillation axis of the movable plate, so as to provide a magnetic field component that crosses the oscillation axis.

5. The optical deflector according to claim 4, wherein a magnetization direction of the permanent magnet is non-parallel to the normal to the first surface of the movable plate.

6. The optical deflector according to claim 1, wherein the oscillating member has one movable plate, the oscillating member has a second oscillation axis that crosses at right angles with the first oscillation axis, the movable plate is allowed to oscillate about the two oscillation axes, and the magnetic field generator includes one permanent magnet, which is off the two oscillation axes of the movable plate, so as to provide a magnetic field component that crosses the two oscillation axes.

7. The optical deflector according to claim 6, wherein a magnetization direction of the permanent magnet is non-parallel to the normal to the first surface of the movable plate.

8. The optical deflector according to claim 1, wherein the oscillating member has additional movable plates, which include the movable plate, aligned in at least one row, wherein the oscillating member has oscillation axes parallel to each other, the oscillation axes respectively correspond to the movable plates, the movable plates are respectively allowed to oscillate about the corresponding oscillation axes, and the magnetic field generator includes two permanent magnets for each movable plate, the two permanent magnets being off the oscillation axis, and symmetrically positioned with respect to a center of the movable plate, so as to provide a magnetic field component that crosses the oscillation axis.

9. The optical deflector according to claim 1, wherein the oscillating member has additional movable plates, which include the movable plate, aligned in at least one row, wherein the oscillating member has oscillation axes parallel to each other, the oscillation axes respectively correspond to the movable plates, the movable plates are respectively allowed to oscillate about the corresponding oscillation axes, and the magnetic field generator includes at least one permanent magnet, which is off the oscillation axis of the movable plate, so as to provide a magnetic field component that crosses the oscillation axis.

10. The optical deflector according to claim 9, wherein the movable plates include at least two movable plates aligned in a line crossing at right angles to the oscillation axis, and one permanent magnet provides the magnetic field component to the two movable plates.

11. The optical deflector according to claim 1, wherein the oscillating member has additional movable plates, which include the movable plate, aligned in at least one row, wherein each of the movable plates is allowed to oscillate about two oscillation axes, and the magnetic field generator includes at least one permanent magnet, which is off two oscillation axes of the movable plate, so as to provide a magnetic field component that crosses the two oscillation axes.

12. The optical deflector according to claim 11, wherein the permanent magnet provides the magnetic field component to the adjacent two movable plates.

13. The optical deflector according to claim 11, wherein the movable plates include at least four movable plates aligned in two rows, and the permanent magnet provides the magnetic field component to the adjacent four movable plates.

14. The optical deflector according to claim 11, wherein the magnetic field generator has the same number of permanent magnets as the number of movable plates, the permanent magnets provide the magnetic field component to the movable plates, respectively, and a magnetization direction of each of the permanent magnets is non-parallel to the normal to the first surface of the corresponding movable plate.

* * * * *